(12) United States Patent
Tokunaga et al.

(10) Patent No.: US 11,202,165 B2
(45) Date of Patent: Dec. 14, 2021

(54) MOBILE DEVICE POSITION ESTIMATION SYSTEM

(71) Applicant: DENSO CORPORATION, Kariya (JP)

(72) Inventors: Shutaro Tokunaga, Nisshin (JP); Takashi Saitou, Nisshin (JP); Tetsuya Kusumoto, Nisshin (JP); Takashi Shinoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/123,669

(22) Filed: Dec. 16, 2020

(65) Prior Publication Data

US 2021/0105573 A1    Apr. 8, 2021

Related U.S. Application Data

(63) Continuation of application No. PCT/JP2019/018473, filed on May 9, 2019.

(30) Foreign Application Priority Data

Jun. 21, 2018   (JP) .............................. JP2018-118148

(51) Int. Cl.
    *H04W 4/02*      (2018.01)
    *H04W 4/40*      (2018.01)

(52) U.S. Cl.
    CPC ............... *H04W 4/02* (2013.01); *H04W 4/40* (2018.02)

(58) Field of Classification Search
    CPC . B60R 25/24; B60R 25/245; B60R 2325/205; B60R 25/209; B60R 25/241; B60R 2325/105; G07C 9/00309; G07C 2209/63; G07C 2009/00769; G07C 2009/00984
    See application file for complete search history.

(56) References Cited

U.S. PATENT DOCUMENTS

| 9,179,331 | B2 * | 11/2015 | Shin ....................... G01S 5/0252 |
| 2014/0243011 | A1 * | 8/2014 | Pan ........................... G01S 11/06 455/456.1 |

(Continued)

FOREIGN PATENT DOCUMENTS

| JP | 2002107443 A | 4/2002 |
| JP | 2011144625 A | 7/2011 |

(Continued)

*Primary Examiner* — Dung Hong
(74) *Attorney, Agent, or Firm* — Harness, Dickey & Pierce, P.L.C.

(57) ABSTRACT

A mobile device position estimation system includes: an in-vehicle device that includes at least three in-vehicle antennas that transmits an electric wave; and a mobile device. The mobile device includes a reception intensity detection portion that detects a reception signal of the electric wave. The in-vehicle device or the mobile device includes a sensitivity error decision portion that decides a reception sensitivity error to cause multiple mobile device detection areas to be closest to a state where the multiple mobile device detection areas intersect at one point while deciding mobile device detection areas, an annular area decision portion that decides multiple annular areas where the mobile device exists, and a mobile device area estimation portion that estimates an overlapping area where the multiple annular areas overlap as a mobile device existence area.

9 Claims, 11 Drawing Sheets

(56) References Cited

U.S. PATENT DOCUMENTS

| | | | | |
|---|---|---|---|---|
| 2015/0004917 A1* | 1/2015 | Juzswik | ............... | H04B 17/21 |
| | | | | 455/67.13 |
| 2015/0249503 A1 | 9/2015 | Sone et al. | | |
| 2015/0371472 A1* | 12/2015 | Kamiya | ............... | B60R 25/24 |
| | | | | 340/5.61 |
| 2016/0070527 A1* | 3/2016 | Ricci | ............... | G06F 3/165 |
| | | | | 715/716 |
| 2017/0327086 A1* | 11/2017 | Katou | ............... | G08C 17/02 |
| 2018/0072268 A1* | 3/2018 | Lee | ............... | H02J 50/12 |
| 2018/0118163 A1* | 5/2018 | Murakami | ............... | B60R 25/01 |
| 2019/0256047 A1* | 8/2019 | Iwashita | ............... | B60R 25/24 |
| 2019/0259230 A1* | 8/2019 | McConnell | ............... | G07C 9/00309 |
| 2020/0122686 A1* | 4/2020 | Siswick | ............... | B60R 25/246 |
| 2021/0204136 A1* | 7/2021 | Lummer | ............... | H04B 17/318 |

FOREIGN PATENT DOCUMENTS

| | | | |
|---|---|---|---|
| JP | 2012255673 A | 12/2012 | |
| JP | 2015166762 A | 9/2015 | |
| JP | 2017040552 A | 2/2017 | |
| JP | 2017044563 A | 3/2017 | |
| JP | 2017083285 A | 5/2017 | |
| JP | 2017135603 A | 8/2017 | |
| JP | 2019085734 A | 6/2019 | |
| WO | WO-2017104373 A1 * | 6/2017 | ............... G01S 5/02 |

\* cited by examiner

MOBILE DEVICE POSITION ESTIMATION SYSTEM

CROSS REFERENCE TO RELATED APPLICATIONS

The present application is a continuation application of International Patent Application No. PCT/JP2019/018473 filed on May 9, 2019, which designated the U.S. and claims the benefit of priority from Japanese Patent Application No. 2018-118148 filed on Jun. 21, 2018. The entire disclosures of all of the above applications are incorporated herein by reference.

TECHNICAL FIELD

The present disclosure relates to a mobile device position estimation system, in particular, a mobile position estimation accuracy.

BACKGROUND

A technique for estimating a position of a mobile device has been known. In a comparative example, based on reception signal intensities of electric waves received from three or more in-vehicle devices, the mobile device estimates a distance between each of the in-vehicle devices and the mobile device. The position of the mobile device is estimated based on this three or more distances.

SUMMARY

A mobile device position estimation system may include: an in-vehicle device that may include at least three in-vehicle antennas that may transmit an electric wave; and a mobile device. The mobile device may include a reception intensity detection portion that may detect a reception signal of the electric wave. The in-vehicle device or the mobile device may include a sensitivity error decision portion that may decide a reception sensitivity error to cause multiple mobile device detection areas to be closest to a state where the multiple mobile device detection areas may intersect at one point while deciding mobile device detection areas, an annular area decision portion that may decide multiple annular areas where the mobile device may exist, and a mobile device area estimation portion that may estimate an overlapping area where the multiple annular areas overlap as a mobile device existence area.

BRIEF DESCRIPTION OF DRAWINGS

The above and other features and advantages of the present disclosure will be more clearly understood from the following detailed description with reference to the accompanying drawings. In the accompanying drawings.

DETAILED DESCRIPTION

Figure 1:
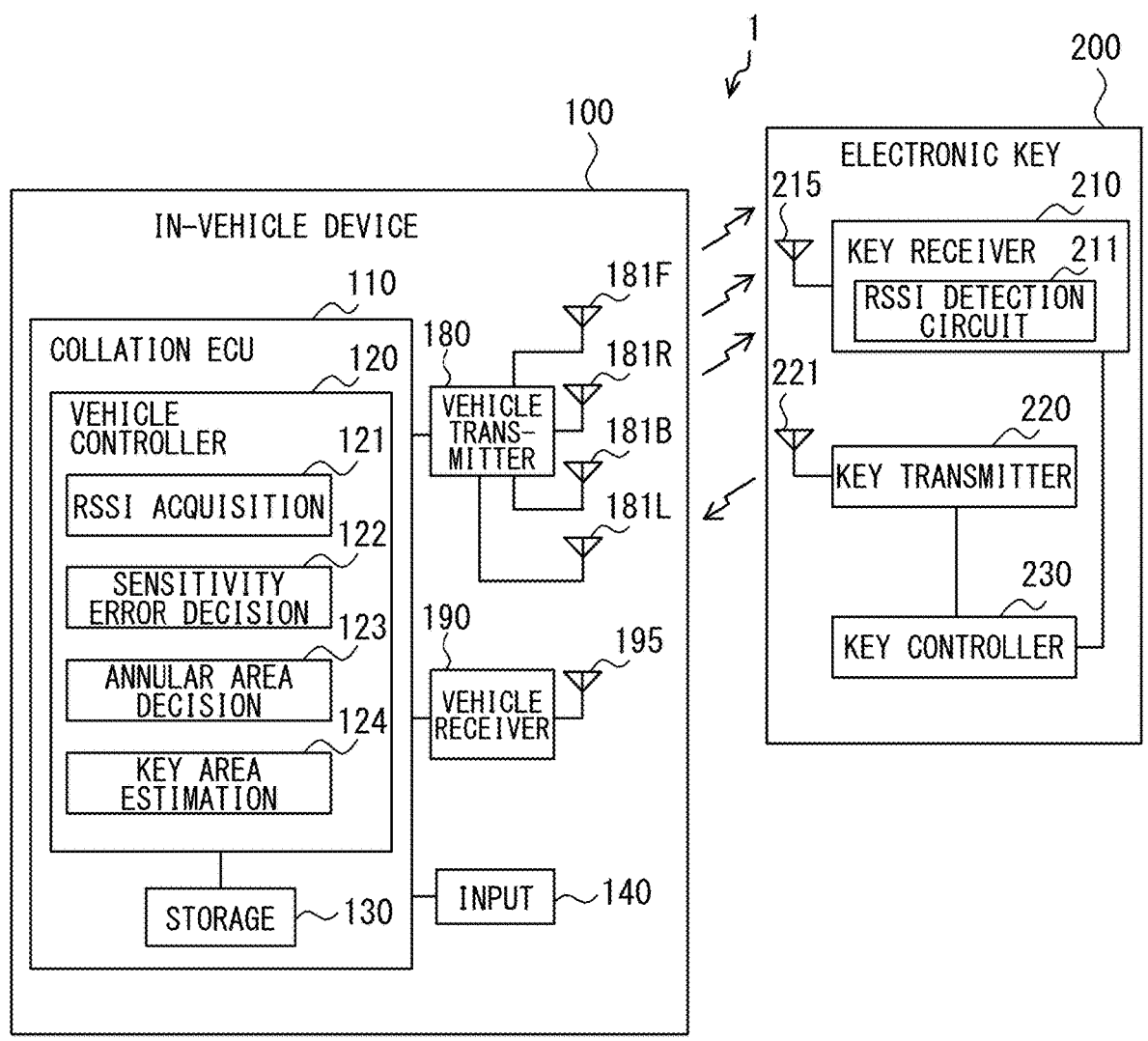
FIG. 1 is a diagram showing a schematic configuration of an electronic key position estimation system according to a first embodiment.

When a position of the mobile device is estimated based on a reception signal intensity, it is estimated that the mobile device exists on a circle centered on a signal transmission source. A distance obtained from the reception signal intensity is used as a radius of the circle. When there are three circles, ideally, the three circles intersect at one point. The point is estimated as a position of the mobile device.

However, there is an error in the reception signal intensity. Accordingly, when the position of the mobile device is estimated based on the reception signal intensity, it is estimated that the mobile device exists in not the circle whose radius is the distance obtained from the reception signal intensity but a circular region defined in consideration of an error range of the reception signal intensity.

Even when the three circular regions are obtained, the overlap of the three circular regions forms not one point but an area. In order to improve a position estimation accuracy of the mobile device, it is necessary to narrow the area where the mobile device is estimated to exist.

One example of the present disclosure provides a mobile device position estimation system capable of narrowing an area where the mobile device is estimated to exist.

According to one example embodiment, the mobile device position estimation system includes an in-vehicle device including at least three antennas that transmit an electric wave and a mobile device carried by a user. The mobile device position estimation system estimates a position where the mobile device exists. The mobile device includes a reception intensity detection portion that detects a reception signal of the electric wave when receiving the electric wave transmitted by the at least three in-vehicle antennas. The in-vehicle device or the mobile device includes a sensitivity error decision portion that decides a reception sensitivity error to cause multiple mobile device detection areas to be closest to a state where the multiple mobile device detection areas decided for the at least three in-vehicle antennas intersect at one point while deciding the multiple mobile device detection areas that are areas where existence of the mobile device is detected for each of the at least three in-vehicle antennas based on a correction reception signal obtained by correcting the reception signal intensity detected by the reception intensity detection portion with the reception sensitivity error of the mobile device, an annular area decision portion that decides multiple annular areas with respect to the at least in-vehicle antennas based on the correction reception signal intensity, an error range of the reception signal intensity, a position of each of the at least three in-vehicle antennas when the error range of the reception signal intensity is an error range when the reception sensitivity error is corrected, and a mobile device area estimation portion that estimates an overlapping area where the multiple annular areas decided by the annular area decision portion with respect to the at least three in-vehicle antenna overlap, as a mobile device existence area where the mobile device exists.

The sensitivity error decision portion decides the mobile device detection area that is an area where existence of the mobile device is detected for each of the at least in-vehicle antennas based on a correction reception signal intensity obtained by correcting the reception signal intensity detected by the reception intensity detection portion with the reception sensitivity error of the mobile device. The mobile device detection areas decided for the at least three in-vehicle antennas are closest to a state where the mobile device detection areas intersect at one point, when the reception sensitivity error can be corrected best. Therefore, the reception sensitivity error is decided so that the mobile device detection areas decided for the at least three in-vehicle antennas are closest to the state where the mobile device detection areas intersect at one point.

An annular area which the mobile device exists is decided for each in-vehicle antenna by using the correction reception signal intensity obtained by correcting the reception signal intensity based on the reception sensitivity error. Since the reception sensitivity error is reflected in the correction reception signal intensity, the error range of the reception signal intensity can be set to the error range when the reception is not corrected. This error range is narrower than the error range when the reception sensitivity error is not corrected since the error sensitivity error is not taken into consideration. Accordingly, the annular area has a thinner annular shape as compared with a case of the error range when the reception sensitivity error is not corrected.

Since the annular areas become thin, the overlapping area that is an area where the annular areas overlap becomes smaller. Since this overlapping area is estimated as the mobile device existence area where the mobile device exists, it may be possible to narrow the mobile device existence area.

Hereinafter, multiple embodiments of a mobile device position estimation system will be described with reference to the drawings. In the embodiments shown below, a mobile device is an electronic key. That is, the embodiments described below are the electronic key position estimation systems.

First Embodiment

FIG. 1 shows a schematic configuration of an electronic key position estimation system 1 according to a first embodiment. The electronic key position estimation system 1 has a function of causing a collation ECU 110 to collate an electronic key 200 based on wireless communication between an in-vehicle device 100 and the electronic key 200, and executes or permitting a predetermined process when the collation is successful. The ECU is an abbreviation for an electronic control unit.

The collation of the electronic key 200 is to confirm whether the electronic key 200 is a formal electronic key 200 associated with the in-vehicle device 100 in advance. For example, the collation is executed as follows. The collation ECU 110 of the in-vehicle device 100 causes a front LF antenna 181F, a right LF antenna 181R, a left LF antenna 181L, and a back LF antenna 181B to transmit a request signal. Hereinafter, when the front LF antenna 181F, the right LF antenna 181R, the left LF antenna 181L, and the back LF antenna 181B are not distinguished, these are described as a LF antenna 181. The LF antenna 181 corresponds to an in-vehicle antenna.

Upon receiving the request signal, the electronic key 200 transmits a response signal including a unique ID. When an in-vehicle RF antenna 195 receives the response signal as the response of the request signal, the collation ECU 110 collates the ID in the response signal. Thereby, the in-vehicle device 100 collates the electronic key 200.

Examples of a predetermined process to be permitted or executed when the collation is established include the following. A vehicle engine is permitted to start when the formal electronic key 200 is positioned in a vehicle interior of a vehicle 5 (see FIG. 2). In addition, a vehicle door is permitted to be unlocked when the formal electronic key 200 is positioned in a predetermined region outside the vehicle. A welcome process for turning on a hazard lamp of the vehicle 5 or the like is executed when the formal electronic key 200 approaches the vehicle 5 by a predetermined distance. The electronic key position estimation system 1 permits or executes a different process depending on a position of the electronic key 200 with respect to the vehicle 5.

The electronic key position estimation system 1 estimates the position of the electronic key 200 with respect to the vehicle 5 when executing or permitting the predetermined process by the collation. Hereinafter, a configuration of the electronic key position estimation system 1 for estimating the position of the electronic key 200 with respect to the vehicle 5 will be described.

(Configuration of Electronic Key Position Estimation System)

As shown in FIG. 1, the electronic key position estimation system 1 includes the in-vehicle device 100 and the electronic key 200. The in-vehicle device 100 is placed in the vehicle 5, and the electronic key 200 is carried by a user.

The in-vehicle device 100 includes the collation ECU 110, an input portion 140, a vehicle transmitter 180, the front LF antenna 181F, the right LF antenna 181R, the left LF antenna 181L, the back LF antenna 181B, a vehicle receiver 190, and the in-vehicle RF antenna 195.

The collation ECU 110 mainly includes a microcomputer. For example, a processor such as a CPU executes a program stored in a storage device such as a ROM, and thereby the collation ECU 110 executes various processes including collation of the electronic key 200 and position estimation of the electronic key 200 in cooperation with the electronic key 200. At least a part of the functions of the collation ECU 110 may be provided by a dedicated IC or the like.

The input portion 140 is operated when the user performs an error estimation start operation. The input portion 140 is, for example, a switch placed in the interior of the vehicle 5.

The vehicle transmitter 180 modulates or amplifies a vehicle signal of a VLF wave or a LF antenna under the control of the collation ECU 110, and causes the LF antenna 181 to transmit the vehicle signal as the electric wave. The electric wave transmitted from the LF antenna 181 is an in-vehicle antenna electric wave. The LF is an abbreviation for Low Frequency. The VLF is an abbreviation for Very Low Frequency. In the present disclosure, the LF may include the VLF. When the request signal is transmitted as the vehicle signal, information requesting the electronic key 200 to return the response signal including the unique ID is included. Each vehicle signal includes identification information that enables identification of the LF antenna 181 corresponding to the transmission source.

Figure 2:
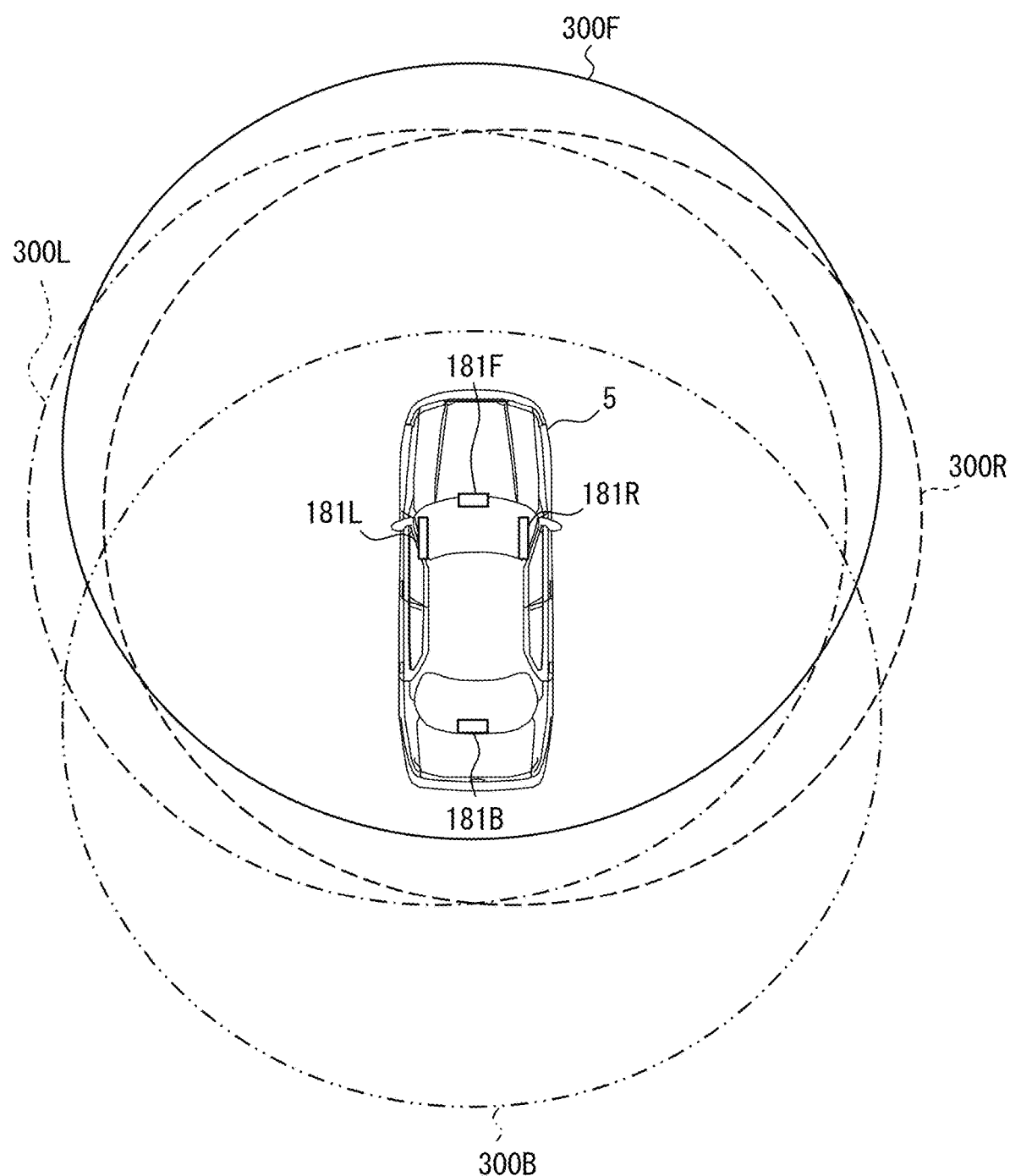
FIG. 2 is a view showing a position of a LF antenna of a vehicle.

FIG. 2 shows the position of the LF antenna 181. The front LF antenna 181F is placed at a front end of the vehicle compartment near the center in a vehicle width direction. The right LF antenna 181R is placed at a vehicle inside door knob of a vehicle right door. The back LF antenna 181B is placed at a back end of the vehicle compartment near the center in the vehicle width direction. The left LF antenna 181L is placed at a vehicle outside door knob of a left door. The positions of the LF antennas 181 may be variously changed. The number of the LF antennas 181 may be variously changed.

A detectable area 300 is formed around each of the LF antenna 181. Specifically, a front detectable area 300F is formed around the front LF antenna 181F. A right detectable area 300R is formed around the right LF antenna 181R. A back detectable area 300B is formed around the back LF antenna 181B. A left detectable area 300L is formed around the left LF antenna 181L. When the front detectable area 300F, the right detectable area 300R, the back detectable area 300B, and the left detectable area 300L are not distinguished, these detectable areas are described as the detectable area 300.

The detectable area 300 is an area where the electronic key 200 can receive the vehicle signal transmitted from the LF antenna 181 with a reception signal intensity (hereinafter, RSSI) equal to or higher than a predetermined threshold value. In FIG. 2, shapes of the detectable areas 300 are simplified to be circular, and sizes of the detectable areas 300 are simplified to the same size. However, the size of the detectable area 300 can be adjusted to some extent by setting a transmission output of the LF antenna 181, a reception sensitivity of the electronic key 200, or the like. The shape of the detectable area 300 can be adjusted by changing an antenna shape or the like.

As shown in FIG. 2, each of the detectable areas 300 is formed inside and outside the vehicle. The detectable areas 300 formed in the inside and the outside of the vehicle are, for example, implemented by limiting an electromagnetic shielding function of a vehicle body. The electromagnetic shielding function is limited by forming the vehicle body with a resin. Each of four detectable areas 300 is formed in the inside and the outside of the vehicle, and thereby the overlap of four detectable areas 300 occurs not only inside the vehicle but also outside the vehicle 5 over 360 degrees around the vehicle 5.

As shown in FIG. 1, the vehicle receiver 190 receives a key signal transmitted from the electronic key 200 as a RF (Radio Frequency) wave via the in-vehicle RF antenna 195. The vehicle receiver 190 amplifies an electric signal acquired from the in-vehicle RF antenna 195, demodulates the key signal from the electric signal, and outputs the key signal to the collation ECU 110. The in-vehicle RF antenna 195 is placed at a position that is appropriately set at the vehicle 5. For example, the in-vehicle RF antenna 195 may be positioned near a center of the vehicle 5 inside the vehicle compartment.

The key signal including the unique ID transmitted from the electronic key 200 as the response to the request signal is a response signal. The key signal may include RSSI information indicating RSSI when the electronic key 200 further receives the vehicle signal. The RSSI information includes identification information that enables identification of the LF antenna 181 corresponding to the transmission sources of the RSSI and the vehicle signal.

A configuration of the electronic key 200 will be described. The electronic key 200 includes a key receiver 210, a key LF antenna 215, a key transmitter 220, a key RF antenna 221, and a key controller 230.

The key receiver 210 acquires the electric signal indicating the in-vehicle antenna electric wave transmitted from the LF antenna 181 via the key LF antenna 215. The key receiver 210 demodulates and amplifies the electric signal, extracts the vehicle signal, and output the vehicle signal to the key controller 230.

A RSSI detection circuit 211 is placed in the key receiver 210. The RSSI detection circuit 211 is a circuit that detects the RSSI of the in-vehicle antenna electric wave received by the key LF antenna 215, that is, the vehicle signal. The RSSI detection circuit 211 outputs the detected RSSI to the key controller 230. The RSSI detection circuit 211 corresponds to a reception intensity detection portion.

The key transmitter 220 modulates and amplifies the key signal with the RF wave under the control of the key controller 230, and transmits the key signal from the key RF antenna 221. The key signal is generated by the key controller 230. The key signal includes the RSSI information indicating the RSSI of the vehicle signal or the unique ID of the electronic key 200. Since the response signal is also the key signal, the response signal also includes the unique ID.

The key controller 230 mainly includes the microcomputer. For example, the key controller 230 has a function of executing various processes including the collation of the electronic key 200 and the position estimation of the electronic key 200 in cooperation with the in-vehicle device 100 by causing the processer such as the CPU to execute the program stored in a storage device such as the ROM. The position estimation will be described later. At least a part of the functions of the key controller 230 may be provided by a dedicated IC or the like.

(Function of Collation ECU)

A function of the collation ECU 110 for estimating the position of the electronic key 200 with respect to the vehicle 5 will be described. As shown in FIG. 1, the collation ECU 110 includes a vehicle controller 120 and a storage 130.

The vehicle controller 120 includes, as functional blocks, a RSSI acquisition portion 121, a sensitivity error decision portion 122, an annular area decision portion 123, and a key area estimation portion 124.

In a case where the key signal received by the vehicle receiver 190 includes the RSSI information, the RSSI acquisition portion 121 acquires the RSSI when the electronic key 200 receives the vehicle signal based on the RSSI information. Hereinafter, the RSSI when the electronic key 200 receives the vehicle signal transmitted from the front LF antenna 181F is referred as a front RSSI. The RSSI when the electronic key 200 receives the vehicle signal transmitted from the right LF antenna 181R is referred as a right RSSI. The RSSI when the electronic key 200 receives the vehicle signal transmitted from the back LF antenna 181B is referred as a back RSSI. The RSSI when the electronic key 200 receives the vehicle signal transmitted from the left LF antenna 181L is referred as a left RSSI.

The sensitivity error decision portion 122 decides a reception sensitivity error of the electronic key 200. Therefore, an area where the existence of the electronic key 200 is detected for each LF antenna 181 is decided based on the corrected RSSI (that is, a correction reception signal intensity) obtained by adding the reception sensitivity error of the electronic key 200 to the RSSI acquired by the RSSI acquisition portion 121. Hereinafter, this area is referred to as a key detection area 302. The key detection area 302 corresponds to a mobile device detection area.

Figure 3:
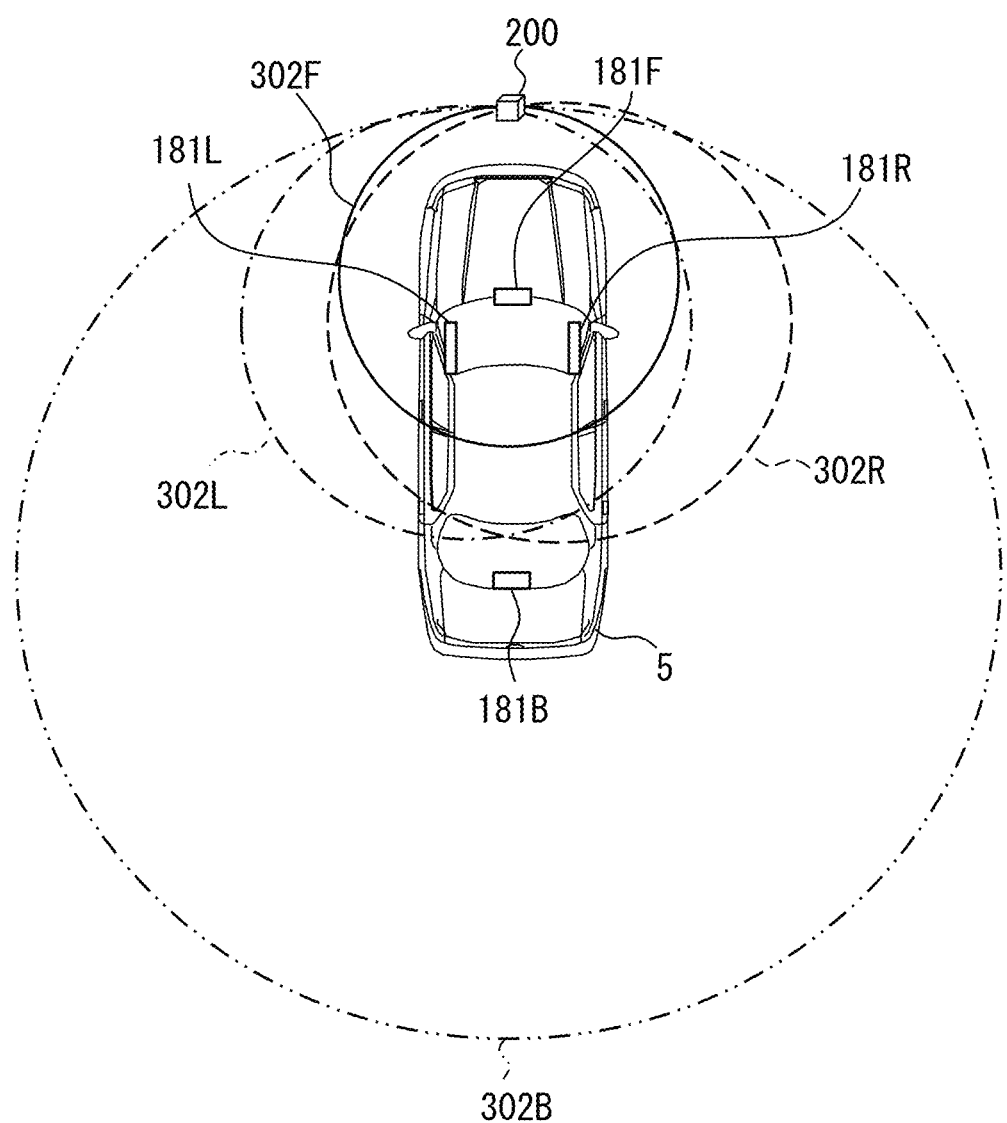
FIG. 3 is a view showing a key detection area corresponding to each LF antenna.

FIG. 3 shows the key detection area 302 corresponding to each LF antenna 181. A key detection area 302F corresponds to the LF antenna 181F, a key detection area 302R corresponds to the LF antenna 181R, a key detection area 302B corresponds to the LF antenna 181B, and a key detection area 302L corresponds to the LF antenna 181L.

Figure 4:
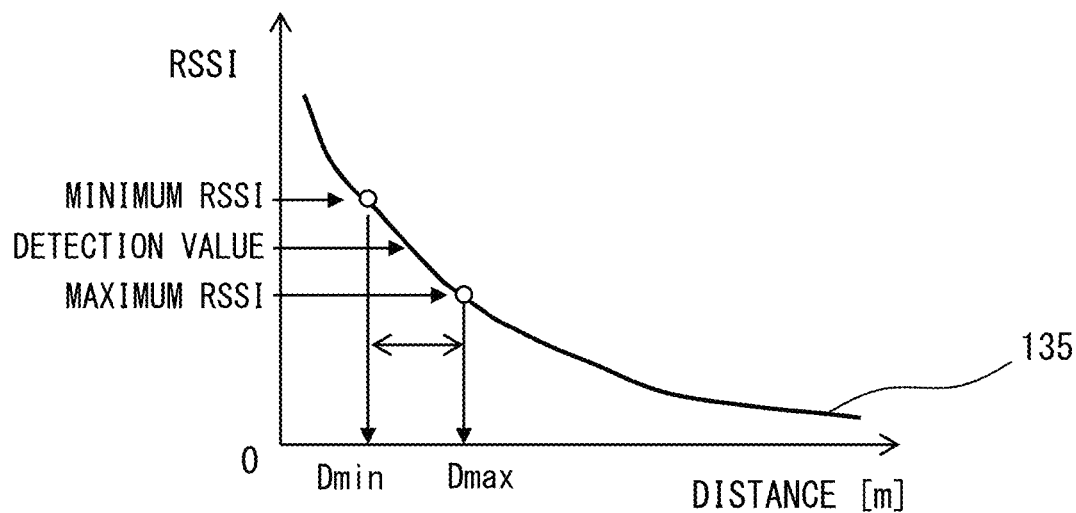
FIG. 4 is a diagram showing a RSSI distance relationship.

Each key detection area 302 is decided based on the RSSI when the electronic key 200 receives the vehicle signal transmitted from each LF antenna 181 and a RSSI distance relationship 135 shown in FIG. 4. FIG. 4 is a diagram conceptually showing the RSSI distance relationship 135. A horizontal axis of the RSSI distance relationship 135 is a distance as shown in FIG. 4. This distance is a distance from the LF antenna 181 to the electronic key 200. A vertical axis is a RSSI detected when the electronic key 200 receives the vehicle signal transmitted from the LF antenna 181.

It has been known that the RSSI decreases as the communication distance increases. The RSSI distance relationship 135 is a relationship between the RSSI and the communication distance. The RSSI distance relationship 135 is a relationship decided based on an experiment, and is stored in the storage 130 or the like.

In FIG. 3, each of the key detection areas 302 is circular. The key detection area 302 means that the electronic key 200 exists on the circumference of this circle. The key detection area 302 does not necessarily have the circular shape, and may have a shape other than a circle such as an ellipse. When the key detection area 302 have the shape other than the circle, for example, the key detection area 302 may be generated by multiplying the distance obtained by applying the RSSI distance relationship 135 to the detected RSSI by a coefficient for each azimuth direction defined based on a directivity of the LF antenna 181.

Each of the key detection areas 302 shown in FIG. 3 shows an ideal state. All of the key detection areas 302 intersect at a position where the electronic key 200 exists. As shown in FIG. 3, the RSSI detected by the RSSI detection circuit 211 needs to be a true value in order to reach the ideal state. However, the RSSI fluctuates due to various errors even when the distance between the LF antenna 181 and the electronic key 200 is the same.

Figure 5:
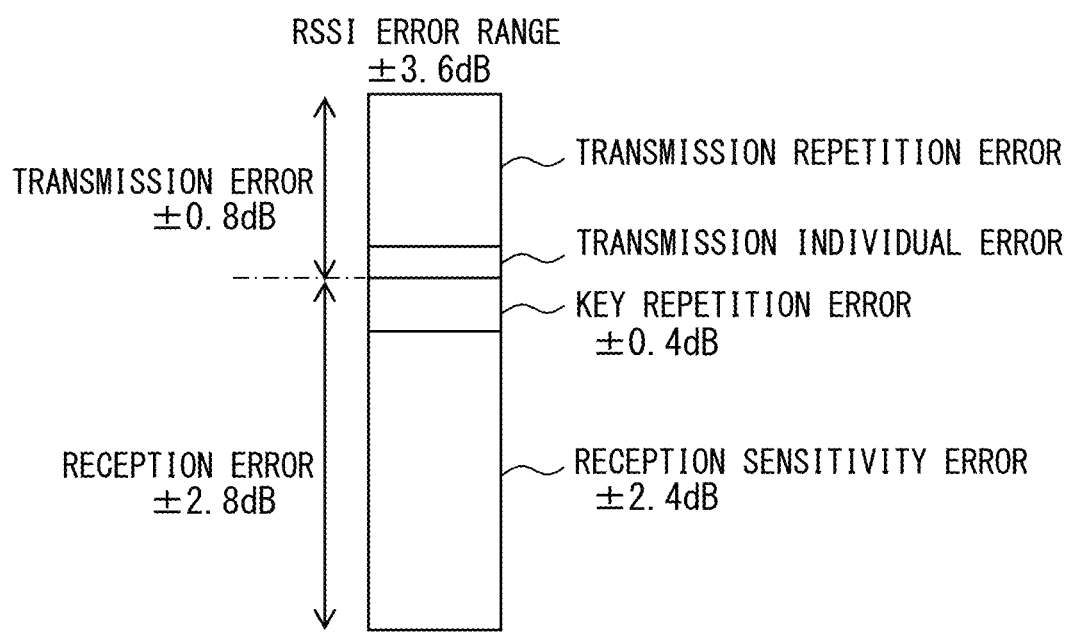
FIG. 5 is a diagram illustrating an error factor of a RSSI.

As shown in FIG. 5, RSSI error factors are roughly divided into a transmission error and a reception error. The transmission error means a fluctuation range of transmission output. The reception error means a fluctuation range of a reception sensitivity.

The transmission error is divided into a transmission individual error and a transmission repetition error. The transmission individual error is a fluctuation range due to an individual difference of the vehicle transmitter 180. The transmission repetition error is a fluctuation range when the same vehicle transmitter 180 repeatedly transmits the same signal. The reception error is divided into the reception sensitivity error and a key repetition error. The reception sensitivity error is a fluctuation range due to an individual difference of the key receiver 210. The key repetition error is a fluctuation range when the same key receiver 210 repeatedly receives the electric wave of the same electric power.

In consideration of these errors, the RSSI detected by the RSSI detection circuit 211 may deviate from the true value. The true value means a value when there is no error on both of the transmission side and the reception side.

However, the upper limit of the RSSI error is set by a design specification. Each numerical value shown in FIG. 5 shows one example of the upper limit. In the example of FIG. 5, the reception sensitivity error is within ±2.4 dB. The key repetition error is within ±0.4 dB. As the result, the reception error is within ±2.8 dB. The transmission error is within ±0.8 dB. The RSSI error range including the transmission error and the reception error is within ±3.6 dB. In the example of FIG. 5, an allowable error range of the RSSI error is 3.6 dB. The RSSI detected by the RSSI detection circuit 211 may deviate from the true value within this allowable error range.

As shown in FIG. 5, when the RSSI error range is ±3.6 dB, the RSSI true value is in the range of RSSI detection value of ±3.6 dB. Then, the RSSI true value is in the range from the RSSI detection value of −3.6 dB to the RSSI detection value of +3.6 dB. Hereinafter, the minimum value of this range is referred to as a minimum RSSI, and the maximum value of this range is referred to as a maximum RSSI.

When the minimum RSSI and the maximum RSSI are applied to the RSSI distance relationship 135, a minimum distance Dmin and a maximum distance Dmax are obtained. In consideration of the RSSI error range, the distance from each LF antenna 181 to the electronic key 200 is between the minimum distance Dmin and the maximum distance Dmax.

Figure 6:
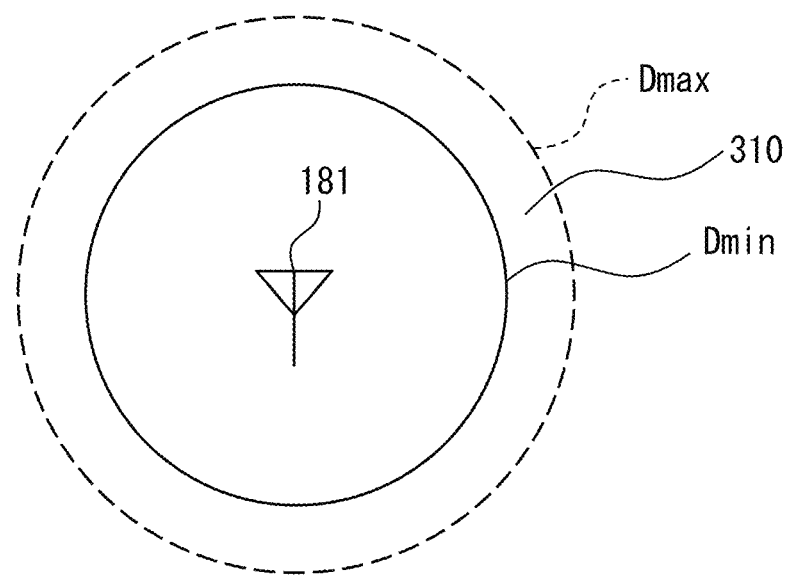
FIG. 6 is a view showing an annular area that is a distance range where an electronic key exists.

FIG. 6 shows a circle centered on the LF antenna 181 and the having the maximum distance Dmax as a radius and a circle centered on the LF antenna 181 and having the minimum distance Dmin as a radius. The electronic key 200 is regarded to exist in an annular area 310 defined by these two circles.

Figure 7:
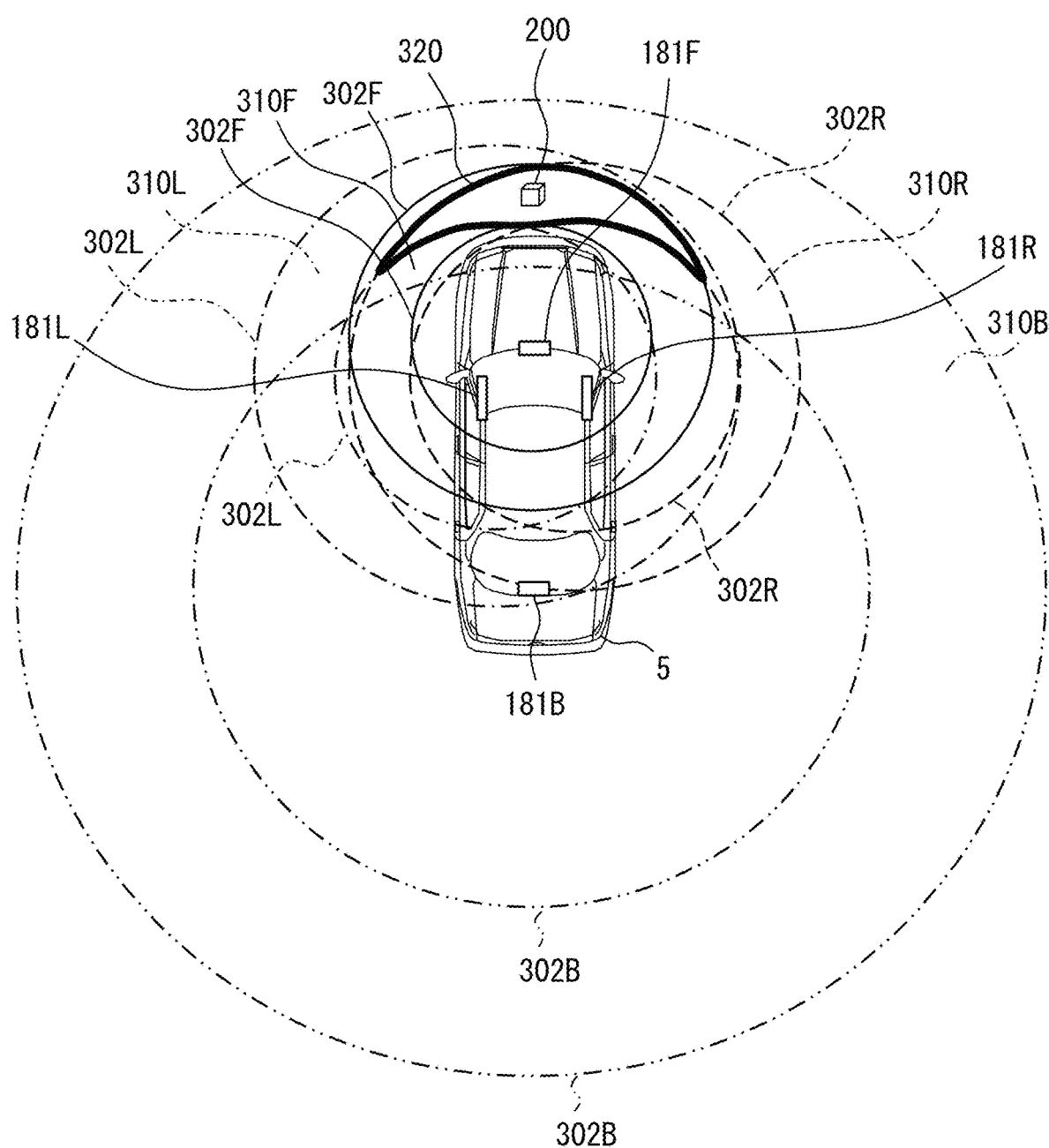
FIG. 7 is a view showing an overlapping area.

When multiple annular areas 310 centered on multiple LF antennas 181 are obtained, it can be estimated that the electronic key 200 exists in an overlapping area 320 in which all the annular areas 310 overlap each other FIG. 7 shows the overlapping area 320. In FIG. 7, two circles indicating the key detection area 302F are shown. A range defined by these two key detection areas 302F is an annular area 310F corresponding to the front LF antenna 181F. Similarly, a range defined by two key detection areas 302R is an annular area 310R corresponding to the right LF antenna 181R. A range defined by two key detection areas 302B is an annular area 310B corresponding to the back LF antenna 181B. A range defined by two key detection areas 302L is an annular area 310L corresponding to the left LF antenna 181L. An overlapping range of these four annular areas 310F, 310R, 310B, and 310L is the overlapping area 320.

In order to improve the position estimation accuracy of the electronic key 200, it is necessary to reduce a difference between the maximum distance Dmax and the minimum distance Dmin for defining each annular area 310. Each annular area 310 shown in FIG. 7 is the annular area 310 when the RSSI error range is the maximum allowable error range, that is, the allowable error range of ±3. 6 dB in the example of FIG. 5.

When the RSSI error range can be made narrower than the allowable error range, the distance between the maximum distance Dmax and the minimum distance Dmin for defining each annular area 310 can be reduced. Here, the number of key receivers 210 is one, and it is a fixed value fixed for each individual. Accordingly, the reception sensitivity error among various errors shown in FIG. 5 is the same value even when the key receiver 210 detects the vehicle signal transmitted from any LF antenna 181.

Based on the above, the sensitivity error decision portion 122 decides a reception sensitivity error. Specifically, a value is changed in the range of ±2.4 dB that is the fluctuation range of the reception sensitivity error. A value obtained by adding the reception sensitivity error to the detected RSSI is defined as the correction RSSI (that is, the correction reception signal intensity). The same reception sensitivity error is added to all of the detected RSSIs, and the correction RSSI is calculated. The correction RSSI is applied to FIG. 4, and the distance is calculated. Each key detection area 302 is generated with this distance as the radius.

When the detected RSSI includes the error, the multiple key detection areas 302 do not overlap at one point. When the distance becomes larger than the actual distance due to the error influence, the area where all the key detection areas 302 overlap each other occurs. On the other hand, the distance becomes shorter than the actual distance due to the error influence, the area where all the key detection areas 302 overlap does not occur. Accordingly, when the value of the reception sensitivity error added to the detected RSSI is a value closest to the true reception sensitivity error, all the key detection areas 302 are closest to the state where all the areas intersect at one point.

While the value of the reception sensitivity error is changed in the fluctuation range of the reception sensitivity error, each of the key detection areas 302 is generated based on the correction RSSI obtained by adding the value of the same reception sensitivity error to the RSSI of the vehicle signal received from each LF antenna 181. The value of the reception sensitivity error when all the key detection area 302 are closest to the state where all the areas intersect at one point is decided as the reception sensitivity error of the electronic key 200 that has detected the RSSI. The decided reception sensitivity error is stored in the storage 130.

The annular area decision portion 123 decides the annular area 310 for each LF antenna 181. Therefore, the correction RSSI is obtained by adding the reception sensitivity error stored in the storage 130 to the RSSI acquired by the RSSI acquisition portion 121.

The minimum RSSI and the maximum RSSI are calculated by adding the minimum value and the maximum value of the RSSI error range to the correction RSSI. However, the RSSI error range here is an error range caused by an error factor excluding the reception sensitivity error among the error factors shown in FIG. 5. This is because the reception sensitivity error is decided and reflected in the correction RSSI. In the example of FIG. 5, the error range here is ±1.2 dB.

Figure 8:
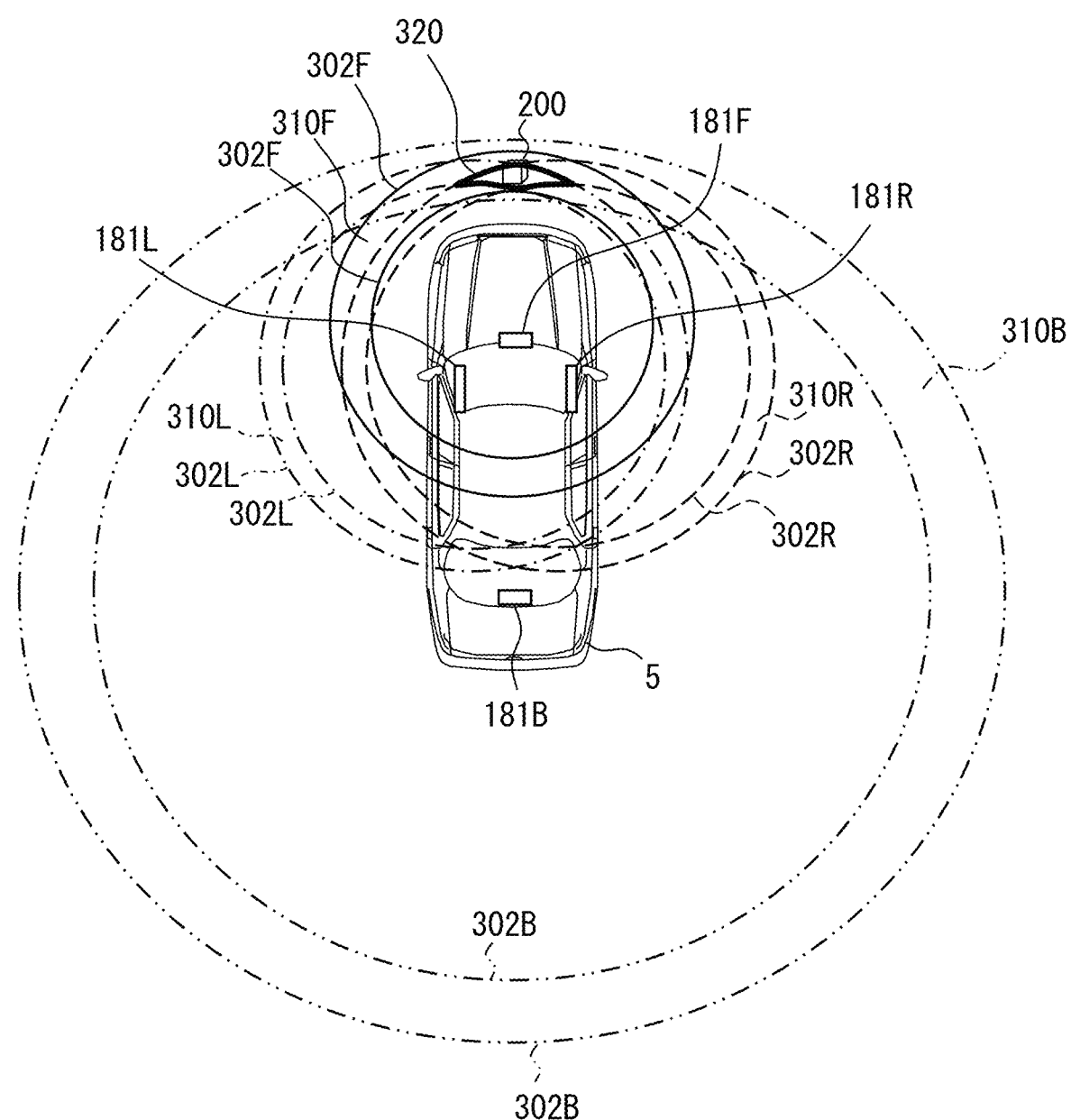
FIG. 8 is a view showing the annular area generated by using the corrected RSSI and the overlapping area.

FIG. 8 shows each decided annular area 310. As compared with each annular area 310 shown in FIG. 7, each annular area 310 shown in FIG. 8 is thinner.

The key area estimation portion 124 sets the overlapping area 320 where all the annular areas 310 decided by the annular area decision portion 123 overlap as the area where the electronic key 200 exists, that is, a mobile device existence area. The key area estimation portion 124 is a mobile device area estimation portion.

(Function of Key Controller)

A function of the key controller 230 of the electronic key 200 for estimating the position of the electronic key 200 with respect to the vehicle 5 in cooperation with the collation ECU 110 will be described.

The key controller 230 has a function of identifying the LF antenna 181 that has transmitted the vehicle signal based on the identification information in the vehicle signal, when acquiring the vehicle signal via the key receiver 210.

The key controller 230 has a function of determining whether the key receiver 210 has received the vehicle signals from at least three LF antennas 181 within the predetermined time. The predetermined time can be predetermined from a transmission time required when all the LF antennas 181 sequentially transmit the vehicle signal.

The key controller 230 has a function of acquiring the RSSI of the vehicle signal that is transmitted from each LF antenna 181 and received by the key receiver 210. The key controller 230 has a function of causing the key RF antenna 221 to transmit the RSSI of the vehicle signal and the key signal including the RSSI information indicating the LF antenna 181 that has transmitted the vehicle signal.

(Key Process)

Figure 9:
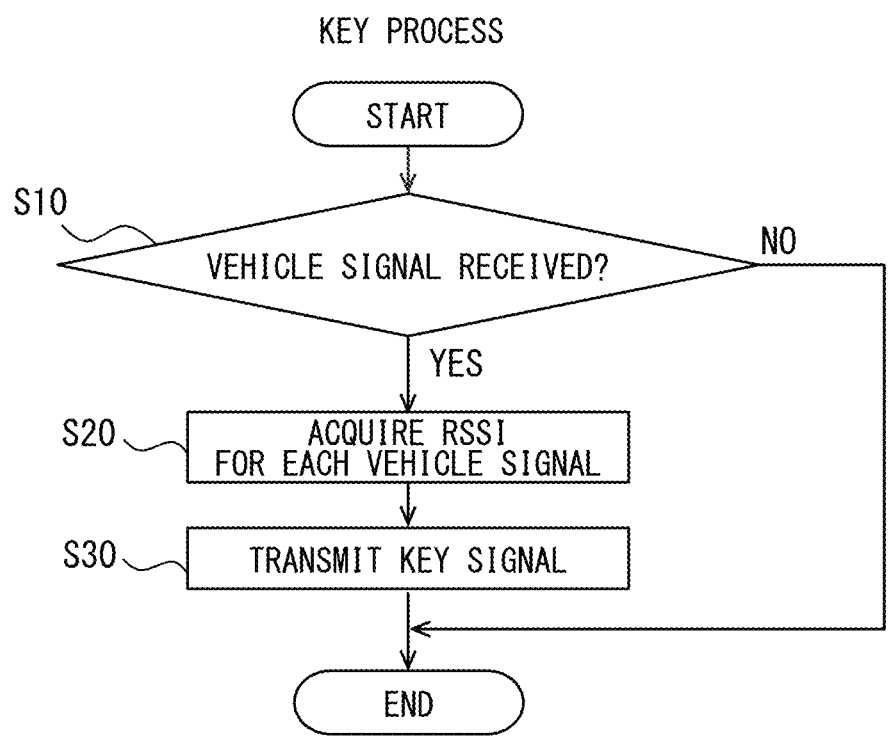
FIG. 9 is a flowchart illustrating a process executed by a key controller of the electronic key.

A key process executed by the key controller 230 of the electronic key 200 for executing the position of the electronic key 200 with respect to the vehicle 5 in cooperation with the collation ECU 110 will be described with reference to FIG. 9. The key process is periodically executed at a predetermined cycle.

In S10, it is determined whether the vehicle signal sequentially transmitted from each LF antenna 181 at a predetermined time interval has been received by the key receiver 210. When the determination is positive in S10, the process shifts to S20. On the other hand, the determination is negative in S10, the current key process ends.

In S20, the RSSI detected by the RSSI detection circuit 211 is acquired when the vehicle signal from each LF antenna 181 is received.

In S30, the key transmitter 220 is controlled, the key RF antenna 221 transmits the key signal including the RSSI information indicating the front RSSI, the right RSSI, the back RSSI, and the left RSSI, and the key process ends.

(In-Vehicle Device Process)

An in-vehicle device process executed by the vehicle controller 120 of the collation ECU 110 for estimating the position of the electronic key 200 with respect to the vehicle 5 in cooperation with the electronic key 200 will be described with reference to FIG. 10. The in-vehicle device process is periodically executed at the predetermined cycle. Alternatively, the process may start in a case where an occasional start condition is satisfied such as a case where a vehicle engine start push switch placed in the vehicle compartment is pressed or a case where the error estimation start operation is performed on the input portion 140. An operation of pressing the vehicle engine start push switch can be set to the error estimation start operation.

In S110, the vehicle signals are sequentially transmitted from all the LF antennas 181 at the predetermined time intervals. Each of the vehicle signals or any of the vehicle signals includes information requesting the electronic key 200 to return the key signal including the RSSI information.

In S120, it is determined whether the key signal including the RSSI information indicating the RSSI when the electronic key 200 receives each vehicle signal transmitted in S110 is received via the in-vehicle RF antenna 195. When the determination is negative in S120, the current in-vehicle device process ends. When the determination is positive in S120, the process shifts to S130.

S130 is a process executed by the RSSI acquisition portion 121. The front RSSI, the right RSSI, the back RSSI, and the left RSSI are acquired based on the RSSI information in the key signal received in S120.

S140 is a process executed by the sensitivity error decision portion 122. It is determined whether the reception sensitivity error has been decided. This determination is performed based on whether the reception sensitivity error is stored in the storage 130. When the determination in S140 is negative, the process shifts to S150. When the determination in S140 is positive, the process shifts to S160.

Figure 11:
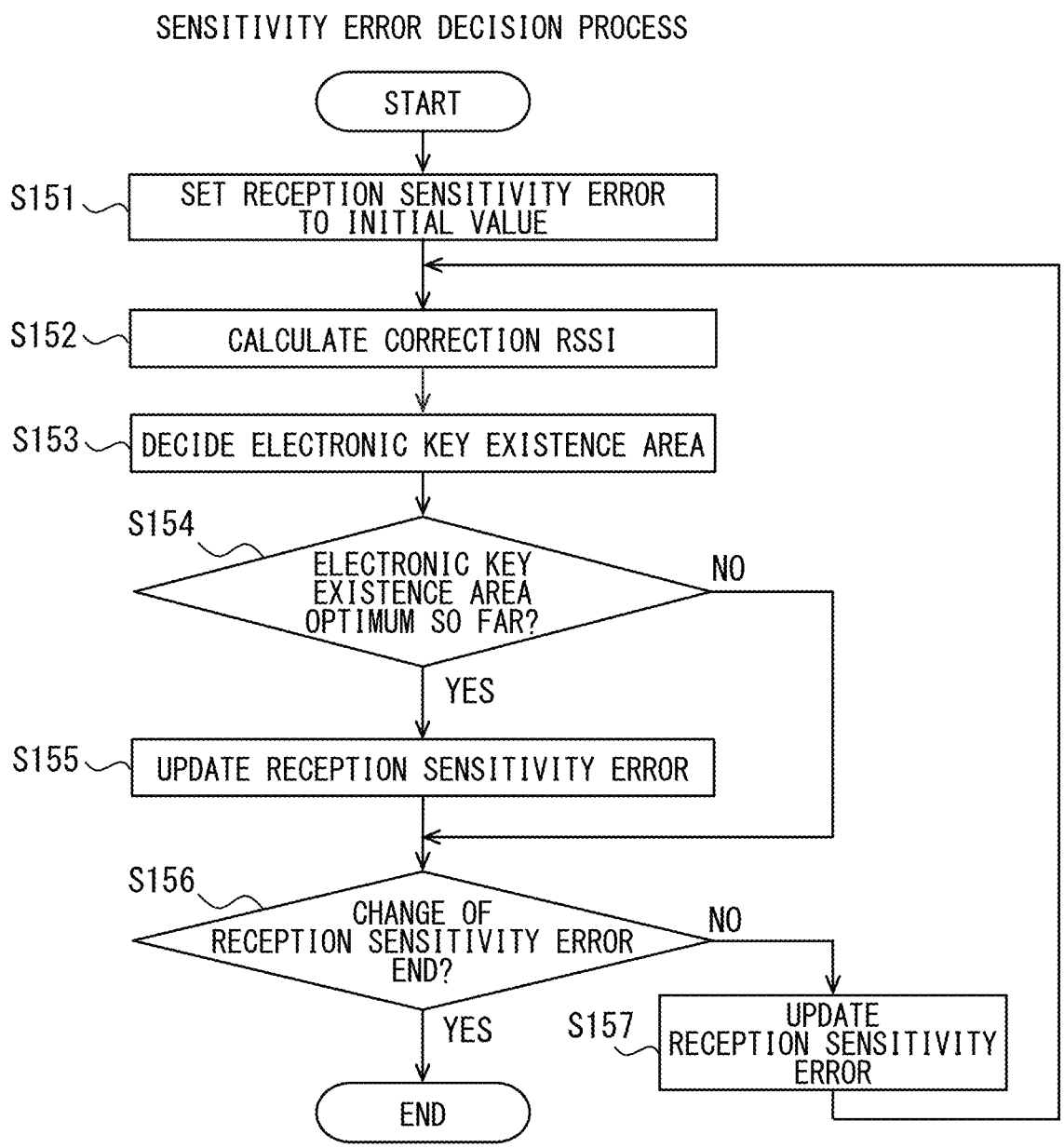
FIG. 11 is a flowchart showing a detailed process of S150 of FIG. 10.

In S150, the sensitivity error decision process is executed. S150 is a process executed by the sensitivity error decision portion 122. The process in S150 is shown in detail in FIG. 11.

In S151, the reception sensitivity error is set to an initial value. When the allowable range of the reception sensitivity error is ±2.4 dB, the initial value is, for example, −2.4 dB. In S152, the correction RSSI is calculated by adding the current reception sensitivity error to the RSSI acquired in S130.

In S153, the correction RSSI calculated in S152 is applied to the RSSI distance relationship 135 exemplified in FIG. 4, and the distance is calculated. Based on the distance, the key detection area 302 is decided for each LF antenna 181.

In S154, it is determined whether the key detection area 302 is optimal until now. In other words, it is determined whether the key detection area 302 is optimal up to S154. Specifically, it is determined whether a relative relationship of all the key detection areas 302 is closest to the state where all the areas intersect at one point so far. When the determination in S154 is YES, the process shifts to S155. In a case of the first determination in S154, the process shifts to S155.

In S155, the reception sensitivity error stored in the storage 130 is updated to a value used this time. When the reception sensitivity error is not stored in the storage 130, the reception sensitivity error used this time is stored in the storage 130.

After execution in S155, the process shifts to S156. When the determination is negative in S154, the process shifts to S156. In S156, it is determined whether the reception sensitivity error is changed in the entire allowable fluctuation range. When the determination result is a negative determination, the process shifts to S157.

In S157, the reception sensitivity error is changed by a predetermined value. The predetermined value is a value that can divide the allowable fluctuation range into multiple ranges, and can be set arbitrarily. After execution in S157, the process returns to S152. When the determination becomes positive in S156 while the processes in S152 to S157 are repeated, the process shown in FIG. 11 ends.

Figure 10:
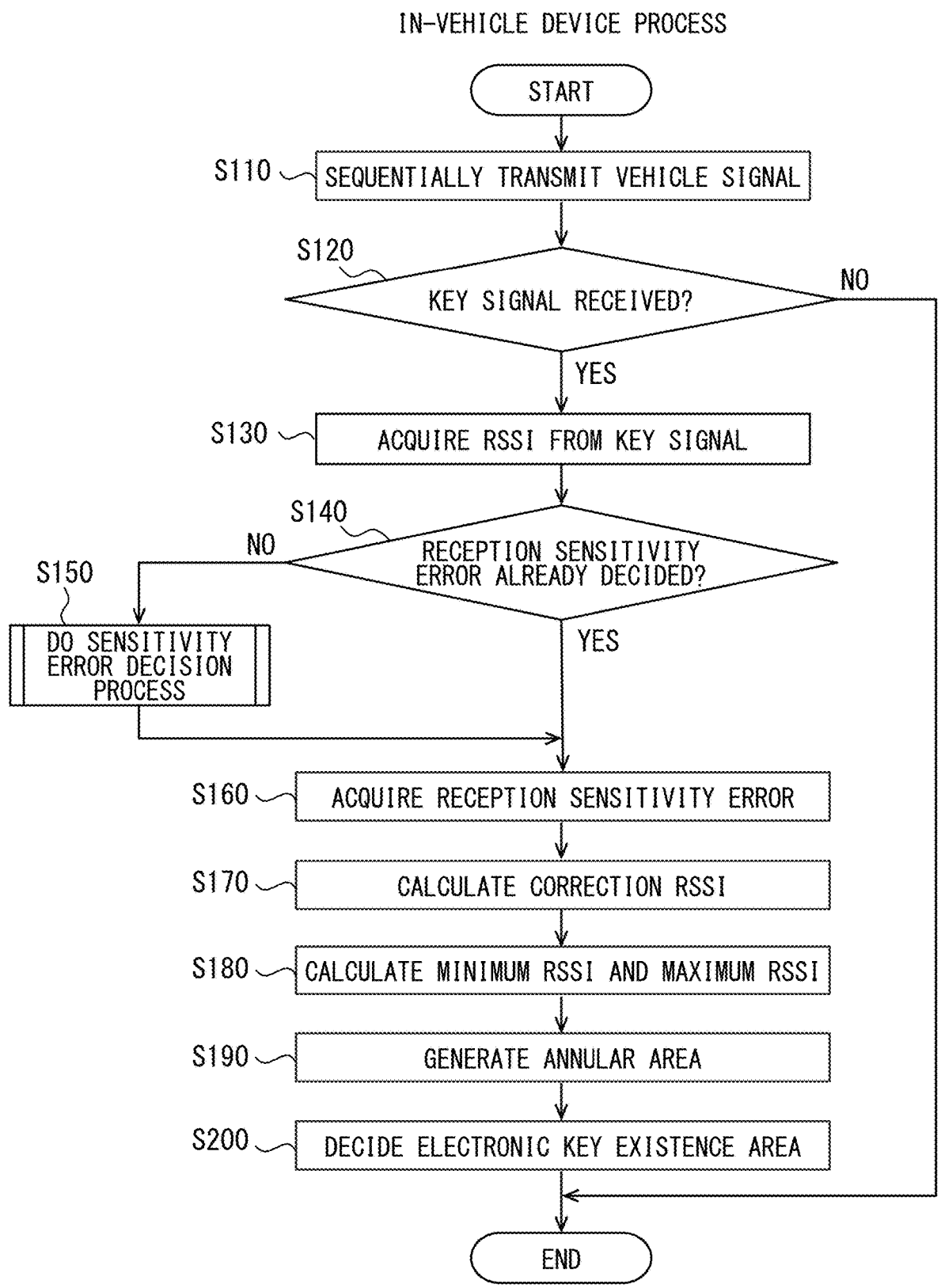
FIG. 10 is a flowchart illustrating an in-vehicle device process executed by a vehicle controller of a vehicle device.

As shown in FIG. 10, when S150 is executed or when the determination is negative in S140, the process shifts to S160. The annular area decision portion 123 executes S160 to S190. In S160, the reception sensitivity error is acquired from the storage 130.

In S170, the correction RSSI corresponding to each RSSI acquired in S130 is calculated by adding the reception sensitivity error acquired in S160 to each RSSI acquired in S130. In S180, the minimum RSSI and the maximum RSSI are calculated for each correction RSSI by adding the minimum value and the maximum value of the error range due to the error factor excluding the reception sensitivity error to each correction RSSI calculated in S170.

In S190, the annular area 310 is generated for each LF antenna 181 based on the minimum RSSI and the maximum RSSI calculated in S180.

S200 is a process executed by the key area estimation portion 124. In S200, the overlapping area 320 where all the annular areas 310 generated in S190 overlap is determined. The overlapping area 320 is set to the electronic key existence area.

In the present embodiment, the reception sensitivity error is decided based on a situation where each RSSI includes the same reception sensitivity error and a situation where the reception sensitivity error can be corrected best when all the key detection areas 302 are closest to the state where all the areas intersect at one point.

That is, in the present embodiment, the key detection area 302 is generated for each LF antenna 181 based on the correction RSSI obtained by adding the reception sensitivity error to the detected RSSI while the reception sensitivity error is sequentially changed. The correction RSSI used at the position estimation of the electronic key 200 is decided with the correct reception sensitivity error. The correct reception sensitivity error is a value of the reception sensitivity error when the key detection areas 302 for the LF antennas 181 intersect at one point. When the reception sensitivity error is decided to one value, it becomes unnecessary to consider the reception sensitivity error in the error range when the annular area 310 is generated. Therefore, the annular area 310 can have the thin annular shape. As the result, it is possible to narrow the overlapping area 320, that is, the key existence area.

In the present embodiment, the decided reception sensitivity error is stored in the storage 130. When the reception sensitivity error is stored in the storage 130, the correction RSSI is calculated based on the reception sensitivity error stored in the storage 130. Thereby, it becomes unnecessary to execute the sensitivity error decision process shown in S150 for each time the area where the electronic key 200 exists is estimated.

Second Embodiment

A second embodiment will be described. In the following description of the second embodiment, elements having the same reference numerals as those used so far are the same as the elements having the same reference numerals in the previous embodiment, except when specifically mentioned. When only a part of the configuration is described, the embodiment described above can be applied to other parts of the configuration.

Figure 12:
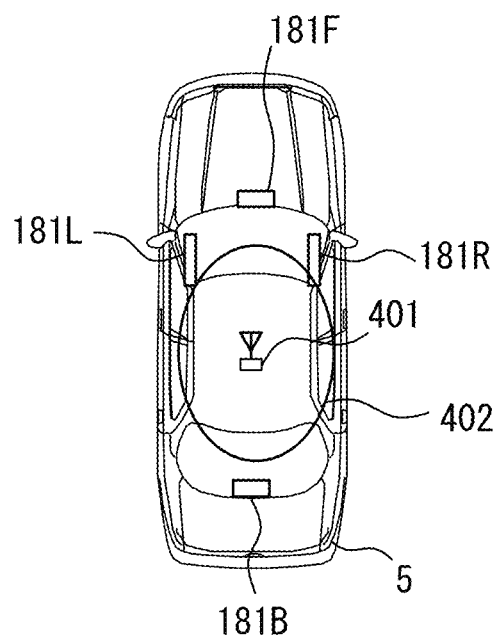
FIG. 12 is a view showing a position of an inner region determination antenna.

In the second embodiment, the in-vehicle device 100 includes an inner region determination antenna 401 shown in FIG. 12 in addition to the configuration shown in FIG. 1. The inner region determination antenna 401 can receive the key signal similarly to the in-vehicle RF antenna 195. However, as shown in FIG. 12, a detection region 402 of the key signal is adjusted so as to be inside the vehicle 5. More specifically, the detection region 402 is a region (hereinafter, an inner region) surrounded by four LF antennas 181.

In the second embodiment, the reception sensitivity error is decided on the condition that the inner region determination antenna 401 receives the key signal, that is, the in-vehicle device 100 and the electronic key 200 can communicate with each other by the inner region determination antenna 401.

As can be seen from the RSSI distance relationship 135 shown in FIG. 4, when the distance from the LF antenna 181 is long, the distance changes greatly due to a slight difference in the RSSI. Therefore, in a state where the electronic key 200 is far from the LF antenna 181, the key detection area 302 significantly changes even when the reception sensitivity error slightly changes. Accordingly, in the state where the electronic key 200 is far from the LF antenna 181, it may be difficult to accurately decide the reception sensitivity error.

In other words, the reception sensitivity error can be decided more accurately by deciding the reception sensitivity error when the position of the electronic key 200 is close to all the LF antennas 181. In the second embodiment, the reception sensitivity error is decided on the condition that the inner region determination antenna 401 receives the key signal. When the inner region determination antenna 401 receives the key signal, the electronic key 200 is in the inner region. When the electronic key 200 is in the inner region, the position of the electronic key 200 is close to all the LF antennas 181.

Although the embodiments have been described above, the disclosed technology is not limited to the above-described embodiments, and the following modifications are included in the disclosed range, and various modifications can be made without departing from the gist except as described below.

(First Modification)

The position of the LF antenna 181 is not limited to the example described above. The LF antenna 181 may be placed at any position as long as it is placed apart from the vehicle 5. However, it is preferable that the separation distance between the multiple LF antennas 181 is long. Further, the number of LF antennas 181 is not limited to four, and may be three or more.

(Second Modification)

In the embodiment, the electronic key 200 is described as the mobile device. However, a portable device having no key function can also be adopted.

(Third Modification)

In the embodiments, the in-vehicle device 100 includes the LF antenna 181 that transmits the LF wave as the antenna for transmitting the electric wave. However, the transmitted electric wave may be in a frequency band other than the LF wave. For example, the in-vehicle device 100 may include an antenna that transmits an RF wave instead of the LF antenna 181.

The RF wave is sometimes called an UHF wave. The specific frequencies of the RF wave include, for example, 315 Hz, 920 MHz, 2.4 GHz, and the like. Communication systems using these frequencies include a communication system that performs pairing to authenticate each other in advance. For example, Bluetooth (registered trademark) performs pairing. The pairing may also be possible between the in-vehicle device 100 and the electronic key 200.

The user performs the operation of instructing the start of pairing. The pairing itself can be performed as long as devices communicating with each other are within the communicable range. However, the user should instruct the start of pairing when the devices communicating with each other are nearby. That is, while the pairing is performed, or for a certain period after the pairing, it can be estimated that the electronic key 200 is near the in-vehicle device 100.

While the pairing is executed or within the certain period after the pairing, the sensitivity error decision process may be executed. Even when the sensitivity error decision process is executed in such a manner, it may be possible to decide the reception sensitivity error accurately. The certain period is appropriately set to ten seconds or the like.

(Fourth Modification)

In the embodiments, after the sensitivity error decision process is executed and the reception sensitivity error is decided, the reception sensitivity error is not updated. However, the reception sensitivity error may be sequentially updated, and the reception sensitivity error stored in the storage 130 may be set as the latest reception sensitivity error. For example, the reception sensitivity error may be updated on a condition that an elapsed time from the decision of the reception sensitivity error is equal to or higher than the certain time. In other words, the reception sensitivity error may be updated on a condition that an elapsed time from the previous decision is equal to or higher than the certain time. This is in consideration of a possibility that the reception sensitivity error may change due to a battery consumption of the electronic key 200 or the like after the certain time or more has passed.

(Fifth Modification)

The reception sensitivity error may be updated on a condition that the electronic key 200 is closer to the center of the gravity position of all the LF antennas 181 than the position of the electronic key 200 when the reception sensitivity error stored in the storage 130 is decided. This is because it may be possible to accurately decide the reception sensitivity error as the reception sensitivity error is determined when the electronic key 200 is closer to the center of the gravity of all the LF antennas 181.

(Sixth Modification)

In the embodiments, the in-vehicle device 100 decides the reception sensitivity error. However, when the key controller 230 includes the configuration of the vehicle controller 120 and also the in-vehicle device 100 notifies the electronic key 200 of the position of the LF antenna 181, the electronic key 200 can execute the process in S130 and the subsequent processes in FIG. 10. The position of the LF antenna 181 is indicated by latitude and longitude. When the electronic key 200 decides the electronic key existence area, the electronic key 200 may notify the in-vehicle device 100 of the electronic key existence area.

Since the in-vehicle device 100 and the electronic key 200 can communicate with each other, the electronic key 200 can execute a part of the processes executed by the in-vehicle device 100. For example, the electronic key 200 may execute a part pf the operation of the vehicle controller 120.

(Seventh Modification)

The electronic key 200 may include the input portion 140.

In the above, the embodiment, the configuration, and the aspect of the mobile device position estimation system according to the present disclosure are exemplified. However, the present disclosure is not limited to every embodiment, every configuration and every aspect related to the present disclosure that are exemplified. For example, embodiments, configurations, and aspects obtained from an appropriate combination of technical elements disclosed in different embodiments, configurations, and aspects are also included within the scope of the embodiments, configurations, and aspects of the present disclosure.

The controller and the method described in the present disclosure may be implemented by a special purpose computer configuring a processor programmed to perform one or more functions embodied by a computer program. Alternatively, the controller and the method described in the present disclosure may be implemented by a dedicated computer configured as a processor with a dedicated hardware logic circuits. Alternatively, the controller and the method described in the present disclosure may be implemented by one or more dedicated computers configured by a combination of a processor executing a computer program and one or more hardware logic circuits. The computer programs may be stored, as instructions to be executed by a computer, in a tangible non-transitory computer-readable storage medium.

It is noted that a flowchart or the process of the flowchart in the present disclosure includes multiple steps (also referred to as sections), each of which is represented, for instance, as S10. Further, each step can be divided into several sub-steps while several steps can be combined into a single step.

The invention claimed is:

1. A mobile device position estimation system configured to estimate a position at which a mobile device exists, the mobile device position estimation system comprising:
   an in-vehicle device that includes at least three in-vehicle antennas configured to transmit an electric wave; and the mobile device that is carried by a user using a vehicle, wherein:

the mobile device includes a reception intensity detection portion configured to detect a reception signal of the electric wave when receiving the electric wave transmitted by the at least three in-vehicle antennas; and the in-vehicle device or the mobile device includes a sensitivity error decision portion configured to decide a reception sensitivity error to cause a plurality of mobile device detection areas to be closest to a state where the plurality of mobile device detection areas decided for the at least three in-vehicle antennas intersect at one point while deciding the plurality of mobile device detection areas that are areas where existence of the mobile device is detected for each of the at least three in-vehicle antennas based on a correction reception signal obtained by correcting the reception signal intensity detected by the reception intensity detection portion with the reception sensitivity error of the mobile device, an annular area decision portion configured to decide a plurality of annular areas where the mobile device exists for each of the at least three in-vehicle antennas based on a correction reception signal intensity, an error range of the reception signal intensity, a position of each of the at least three in-vehicle antennas when the error range of the reception signal intensity is an error range of the correction reception sensitivity error, and a mobile device area estimation portion configured to estimate an overlapping area where the plurality of annular areas decided by the annular area decision portion with respect to the at least three in-vehicle antenna overlap, as a mobile device existence area where the mobile device exists.

2. The mobile device position estimation system according to claim 1, further comprising:

a storage configured to store the reception sensitivity error decided by the sensitivity error decision portion, wherein:

the annular area decision portion is configured to acquire the reception sensitivity error from the storage portion, correct the reception signal intensity detected by the reception intensity detection portion based on the reception sensitivity error, and calculate the correction reception signal intensity.

3. The mobile device position estimation system according to claim 2, wherein:

the sensitivity error decision portion is configured to sequentially decide the reception sensitivity error, and update the reception sensitivity error stored in the storage to a latest reception sensitivity error.

4. The mobile device position estimation system according to claim 3, wherein:

the sensitivity error decision portion is configured to update the reception sensitivity error when the mobile device existence area is closer to a center of a gravity of the at least three in-vehicle antennas than the mobile device existence area when the reception sensitivity error has been decided so far.

5. The mobile device position estimation system according to claim 3, wherein:

the sensitivity error decision portion is configured to update the reception sensitivity error on a condition that an elapsed time from a previous decision of the reception sensitivity error is equal to or higher than a certain time.

6. The mobile device position estimation system according to claim 2, wherein:

either the in-vehicle device or the mobile device includes an input portion for performing an error estimation start operation by the user; and the sensitivity error decision portion is configured to decide the reception sensitivity error based on the error estimation start operation that has been performed on the input portion.

7. The mobile device position estimation system according to claim 1, wherein:

the mobile device and the in-vehicle device are configured to perform pairing to authenticate each other in advance; and the sensitivity error decision portion is configured to decide the reception sensitivity error while the pairing is performed or within a certain period after the pairing.

8. The mobile device position estimation system according to claim 1, wherein:

in addition to the at least three in-vehicle antennas, the in-vehicle device includes an inner region determination antenna configured to communicate with the mobile device when the mobile device is in an inner region of the at least three in-vehicle antennas; and the sensitivity error decision portion is configured to decide the reception sensitivity error in a state where the inner region determination antenna is configured to communicate with the mobile device.

9. A mobile device position estimation system configured to estimate a position at which a mobile device exists, the mobile device position estimation system comprising:

an in-vehicle device that includes at least three in-vehicle antennas configured to transmit an electric wave; and the mobile device that is carried by a user using a vehicle, wherein:

the mobile device includes a reception intensity detection circuit configured to detect a reception signal of the electric wave when receiving the electric wave transmitted by the at least three in-vehicle antennas; and the in-vehicle device or the mobile device includes a processor configured to decide a reception sensitivity error to cause a plurality of mobile device detection areas to be closest to a state where the plurality of mobile device detection areas decided for the at least three in-vehicle antennas intersect at one point while deciding the plurality of mobile device detection areas that are areas where existence of the mobile device is detected for each of the at least three in-vehicle antennas based on a correction reception signal obtained by correcting the reception signal intensity detected by the reception intensity detection circuit with the reception sensitivity error of the mobile device, decide a plurality of annular areas where the mobile device exists for each of the at least in-vehicle antennas based on a correction reception signal intensity, an error range of the reception signal intensity, a position of each of the at least three in-vehicle antennas when the error range of the reception signal intensity is an error range of the correction reception sensitivity error, and estimate an overlapping area where the plurality of annular areas decided with respect to the at least three in-vehicle antenna overlap, as a mobile device existence area where the mobile device exists.

\* \* \* \* \*